United States Patent
Durand et al.

(10) Patent No.: US 9,221,541 B2
(45) Date of Patent: Dec. 29, 2015

(54) PIECE OF FURNITURE FOR AN AIRCRAFT INCLUDING MEANS FOR DISTRIBUTING A CARRIAGE BETWEEN TWO SECTIONS

(71) Applicant: Airbus Operations (SAS), Toulouse (FR)

(72) Inventors: Yves Durand, Aussonne (FR); Bernard Guering, Montrabe (FR)

(73) Assignee: Airbus Operations (SAS), Toulouse (FR)

( * ) Notice: Subject to any disclaimer, the term of this patent is extended or adjusted under 35 U.S.C. 154(b) by 88 days.

(21) Appl. No.: 14/106,216

(22) Filed: Dec. 13, 2013

(65) Prior Publication Data

US 2014/0166806 A1    Jun. 19, 2014

(30) Foreign Application Priority Data

Dec. 14, 2012   (FR) ...................................... 12 62067

(51) Int. Cl.
  *B64D 11/04*   (2006.01)
  *B64D 11/00*   (2006.01)
(52) U.S. Cl.
  CPC ............ *B64D 11/04* (2013.01); *B64D 11/0007* (2013.01)
(58) Field of Classification Search
  USPC .......................................... 244/118.1, 118.5
  See application file for complete search history.

(56) References Cited

U.S. PATENT DOCUMENTS

| 5,314,143 | A | 5/1994 | Luria |
| 5,655,734 | A * | 8/1997 | Dahl ........................... 244/137.1 |
| 6,305,643 | B1 * | 10/2001 | Sankrithi ..................... 244/118.1 |
| 6,454,208 | B1 | 9/2002 | Nervig et al. |
| 6,464,169 | B1 | 10/2002 | Johnson et al. |
| 2005/0133308 | A1 * | 6/2005 | Reysa et al. ...................... 186/40 |
| 2005/0230540 | A1 | 10/2005 | Harrington et al. |
| 2006/0186268 | A1 * | 8/2006 | Harrington et al. ......... 244/118.5 |
| 2009/0294394 | A1 | 12/2009 | Girlich |

FOREIGN PATENT DOCUMENTS

GB     2131779     6/1984

OTHER PUBLICATIONS

French Search Report, Aug. 9, 2013.

* cited by examiner

*Primary Examiner* — Justin Benedik
(74) *Attorney, Agent, or Firm* — Greer, Burns & Crain, Ltd.

(57) ABSTRACT

A piece of furniture for an aircraft, including a plurality of carriages a first section forming an interface of use for a user with which at least one carriage may be taken and/or deposited in the piece of furniture and a second section allowing the said carriages to be circulated along at least first and second main directions substantially perpendicular to each other, at least in a plane of the aircraft for storing and/or delivering to the user at least one carriage, the first section and/or the second section including an arrangement for distributing at least one carriage from the second section towards the first section and vice versa.

18 Claims, 12 Drawing Sheets

PIECE OF FURNITURE FOR AN AIRCRAFT INCLUDING MEANS FOR DISTRIBUTING A CARRIAGE BETWEEN TWO SECTIONS

CROSS-REFERENCES TO RELATED APPLICATIONS

This application claims the benefit of the French patent application No. 12 62067 filed on Dec. 14, 2012, the entire disclosures of which are incorporated herein by way of reference.

TECHNICAL FIELD

The present invention relates to the field of furniture for aircraft, notably galley furniture. Such furniture is in particular designated by the term of <<galley>> which conventionally refers to the kitchens of the aircraft in the widest sense. However the invention is not limited to such a field of use, even if the latter is preferential, and also provides the use of the piece of furniture for other types of application, notably for storing elements in an aircraft, for example clothes, luggage, emergency equipment, audio-visual equipment, inter alia.

The invention more specifically relates to a piece of furniture for aircraft and to an aircraft including such a piece of furniture, as well as to a method for storing and/or using an associated carriage.

The invention mainly finds its application in the field of aeronautics, notably for the equipment of cabins of aircraft, for example commercial aircraft of medium size.

BACKGROUND OF THE INVENTION

The cabin of an aircraft is first intended for passengers, and therefore for integrating the seats for passengers. Thus it is the number of seats which may be integrated into the cabin which allows determination of the economic cost effectiveness of the aircraft. As competition is increasingly stronger, it is desirable to optimize at best the layout of the cabin in order to allow integration of a still larger number of seats for passengers in order to increase the cost effectiveness of an aircraft.

Now, within the scope of the layout of an aircraft cabin, in addition to the seats for passengers, it is necessary to provide a consequent number of additional functionalities, which reduce the capability of integrating the seats into the cabin and therefore the cost effectiveness of the aircraft. This may mainly be in the pressurized upper deck of the aircraft, the pilot's cabin, doors and exits for evacuation, storage devices, toilets, pieces of galley furniture generally allowing storage and preparation of the food dedicated to the passengers. The present invention more specifically relates to the case of galley furniture in their preferential customer use related to feeding the passengers and also in a use for storing various elements for the aircraft.

The galley furniture generally comprises very specific technical pieces of furniture dedicated to the storage of food as well as to their preparation. As regards the preparation of the food, the galley furniture mainly have the following functions: ovens, drink dispensers, wash basins, garbage bins, storage spaces, inter alia. As regards storage of food, galley furniture comprises carriages/trolleys which are despatched gradually depending on the needs in the cabin by flight attendants. These trolleys, provided with lockable castors, are sufficiently narrow so as to be able to circulate along a corridor of the cabin. The need for trolleys on an aircraft mainly depend on the number of passengers present in the aircraft and on the layout of the cabin according to the different classes. As an example, an airplane of medium size with a capacity of about 200 passengers requires that about 14 trolleys be provided.

The trolleys are generally stored at the bottom of the galley furniture or else, taking into account the often large number of these trolleys, in one or more additional pieces of furniture which look like simple pieces of furniture rather than galley furniture for cooking. As an example, an airplane of medium size with about 200 passengers, the 14 trolleys may be distributed in pieces of galley furniture located near the front access and evacuation doors. Therefore, the integration into the cabin of pieces of galley furniture takes up a very significant space in the cabin which prevents the integration of additional seats for passengers, and thus reduces the economic cost effectiveness of the aircraft.

Solutions have already been proposed in the prior art for limiting the penalty in the cabin of traditional integrations of galley furniture, in order to increase the available space in the cabin for integrating seats.

For example, a solution is known which consists of integrating the trolleys into the hold, by providing a lift for moving up the trolleys and having them available at the main piece of galley furniture in the cabin. Nevertheless, such a solution is restrictive since most often it requires manual assistance for moving up the trolleys and involves significant removal space both in the cabin and in the hold. Further, the requirement of providing access means makes it difficult to apply in an aircraft of medium size.

Another known solution provides an increase in the storage density of the trolleys in the cabin by superposing several levels of pieces of galley furniture, generally two or three levels, and by resorting to a complex piece of material for semi-automatic or automatic extraction, considering the significant weight of a trolley, for example of about 100 kilos. This other solution is also not entirely satisfactory since the high total height of the superposed pieces of galley furniture makes its application difficult in an airplane of medium size. Further, this solution remains complex to apply.

Moreover, it is known that the conventional structure of the fuselage of an aircraft, in particular of a commercial airplane, is to have a pressurized sealed bottom positioned at the bottom of the cabin, in front of the vertical stabilizer, and then a non-pressurized space of conical shape which is highly scalable in which the horizontal tail of the aircraft is integrated. This non-pressurized space of conical shape does not allow by design any layout of the cabin type.

A known solution is however to displace the pressurized seal bottom to the limit of what is possible towards the rear of the aircraft, in particular as far as the compartment where the auxiliary power generator (APU for Auxiliary Power Unit) is integrated, and this by shifting the horizontal tail which is then directly integrated at the bottom of the vertical stabilizer, as this is the case for example for the airplane of the Falcon type from Dassault Aviation. In this way, it may be possible to have a large additional pressurized space which is in direct communication with the cabin.

This additional pressurized space may then, in the case of an aircraft of large capacity which has significant height, be laid out quite easily. Nevertheless, in the case of an aircraft of medium size, the height of this additional pressurized space is a great penalty since it is relatively small and then strongly degressive, so that the structural layout of this space is strongly limited.

Patent application US 2005/0133308 A1 moreover describes a solution of the system for storing and distributing trolleys in an aircraft.

SUMMARY OF THE INVENTION

The object of the invention is to at least partly find a remedy to the needs mentioned above and to the drawbacks relating to the achievements of the prior art.

The invention notably aims at allowing optimization of the layout of the cabin of an aircraft, notably by providing optimization of the design of the pieces of furniture, in particular the galley furniture, in order to ensure a significant gain in the operation of the aircraft.

The invention also aims at proposing an integration of a piece of furniture, notably a piece of galley furniture, into an aircraft which is less of a penalty in terms of volume for the cabin of the aircraft.

Thus the object of the invention, according to ones of its aspects, is a piece of furniture for an aircraft, including:
 a plurality of trolleys,
 a first section forming the use interface for a user with which at least one trolley may be taken from the piece of furniture and/or deposited therein,
 a second section allowing the trolleys to circulate along at least first and second main directions substantially perpendicular to each other, at least in a plane of the aircraft, for storing and/or conveying towards the user at least one trolley, the first section and/or the second section including means for distributing at least one trolley from the second section to the first section and vice versa.

By means of the invention, it may be possible to increase the layout capacity, and notably the number of seats for passengers, in the cabin of an aircraft. In this way, the cost effectiveness of the aircraft is improved. As an example, an airplane of medium size with about 200 passengers may have its capacity of seat integration increased by about 8 seats. Further, the particular optimized integration allowed by the invention of the piece of furniture, as one single piece, in the rear portion of the aircraft, in particular in an additional pressurized space may give the possibility of circumventing the customary constraints related to the layout of the galley furniture in the aircraft and make the overall layout of the cabin more easy to make.

The piece of furniture according to the invention may further include one or more of the following features taken individually or according to all possible technical combinations.

The piece of furniture may for example be galley furniture.

The piece of furniture may be intended to be integrated at the rear of the fuselage of the aircraft, notably in a pressurized space located at least partly under the vertical stabilizer of the aircraft.

The piece of furniture and notably the plurality of the trolleys may allow storage and/or preparation of food.

The piece of furniture and notably the plurality of trolleys may further allow storage of various elements in the aircraft, for example clothes, luggage, emergency equipment, audio visual equipment, inter alia.

The piece of furniture may form a one-piece assembly, intended to be integrated at the rear of the fuselage at the rear of the aircraft.

When trolleys are circulated, the second section may be configured in order to allow release of a space during displacement of a trolley, this space then being available, intended to be occupied by another trolley (buffering/shuffling principle). In particular, the effective capacity of trolley storage of the second section may be limited to a number of trolleys of less than or equal to the number of trolleys according to the maximum storage capacity of trolleys of the second section reduced by one trolley, to allow circulation of the whole of the trolleys. For example, for a maximum trolley storage capacity of the second section equal to 15 (in other words the second section may receive a maximum of 15 trolleys), the effective trolley storage capacity of the second section may be limited to a number of trolleys of less than or equal to 14. Said at least one space (or location) thereby left vacant (unoccupied by a trolley) of the second section may allow circulation of the whole of the trolleys according to the buffering/shuffling principle.

The second section may form a carousel for circulating the trolleys by allowing the displacement of the trolleys around a central point of the second section, this displacement of trolleys defining at least partly the contour of a geometrical shape, for example a polygonal shape, notably a square, rectangular, rhombus shape, inter alia.

Said at least one plane may be a horizontal plane of the aircraft, or even a sloped plane relatively to the horizontal.

The first section may be similar to a conventional piece of cabin bottom galley furniture. In particular, the first section may include all the customary functionalities related to the preparation of food. For example the first section may include a wash basin, a working surface, a garbage bin, cleaning equipment, technical equipment of the oven type, dispenser of hot and/or cold liquids, storage equipment, inter alia.

The first section may also be configured in order to allow storage of at least one portion of the plurality of the trolleys.

The first section may include one or several insulation panels notably located at the interface between the first and second sections. The first section may at least be partly refrigerated, generally partly.

The second section may allow displacement of the trolleys relatively to each other.

The second section may not be accessible to the user. The second section may, if necessary, be at least partly or even totally refrigerated. The second section may have a variable capacity for storing the trolleys. For example, the second section may allow storage of up to about 15 trolleys.

The first and second sections are advantageously not superposed relatively to each other.

The base of the second section may be raised relatively to the base of the first section, for example, by a height substantially equal to half the height of a trolley. This raising of the base of the second section relatively to the base of the first section may give the possibility of efficiently occupying the available space in the pressurized space located at the rear of the fuselage of the aircraft.

The second section may include distribution means in the form of a trolley raising device, for allowing distribution of at least one trolley from the first section to the second section and vice versa. The first section may include an access for allowing at least one trolley to pass towards the raising device of the second section.

The raising device may include an elevator plate, intended to receive a trolley to be distributed from the first section to the second section or vice versa, configured so as to move along a given direction between a first position substantially in the plane of the base of the first section and a second position substantially in the plane of the base of the second section. The elevator plate may be configured so as to move substantially vertically along said given direction.

The raising device may include at least one electric motor for allowing the raising or lowering of the elevator plate. In particular, the plate may be able to slide, during raising or lowering, along sliding arms, for example formed by worm screws, and an electric motor may be provided for each sliding arm. The raising device may for example include four electric motors, notably synchronized step motors with which it is notably possible to ensure controlled horizontality of the elevator plate, associated with four sliding arms.

The first section and/or the second section may include distribution means in the form of at least a system for inserting (or "swallowing up") and extracting at least one trolley in order to allow the distribution of said at least one trolley from the second section to the first section or vice versa.

The insertion and extraction system may include a retractable yoke able to bear upon at least one wheel of said at least one trolley to be distributed. In particular, the yoke may be able to pivot between a first position in which at least one wheel of said at least one trolley is blocked by the yoke, extending on either side of the wheel, in order to allow the insertion or extraction of said at least one trolley, and a second position in which the yoke has no action on a wheel of said at least one trolley allowing the placement of said at least one trolley before insertion for storing it or removal of said at least one trolley after extraction for its use.

The pivoting of the yoke, in particular for allowing the passing from the first position to the second position and vice versa, may be made possible by suitable positioning of the yoke relatively to the wheel of the trolley. For example, the yoke may be substantially located at the lower or upper portion of the wheel, or even at the central portion of the wheel. The clearance of the trolley relatively to the floor may be greater than or equal to the length of an arm of the yoke, or even greater than or equal to twice the length of an arm of the yoke. A recess may further be provided in the base of the first section and/or in the base of the second section, or even in the floor of the trolley, in order to allow passing of the yoke.

The yoke may be slideably mounted on an insertion and extraction arm. The insertion and extraction arm may for example include a worm screw.

The insertion and extraction system may further include an electric motor for controlling the sliding of the yoke along the insertion and extraction arm.

At least two insertion and extraction systems may be located on either side of said at least one trolley, notably in order to allow an insertion or extraction force to be exerted on the whole of the wheels of said at least one trolley.

Advantageously, the second section includes means for displacing the trolleys along the first and second main directions substantially perpendicular to each other. The second section may thus form a so-called "angular" carousel.

The second section may include at least a conveyor belt for allowing transport of the trolleys, in particular along the first main direction. The conveyor belt may allow automated displacement of a trolley according to a transport mode in which the wheels of the trolley are substantially perpendicular to the conveyor belt and are not urged.

The second section may include at least two conveyor belts, notably able to operate in different displacement directions along the first main direction, or even three, or even four conveyor belts.

The elevator plate may include at least one conveyor belt, notably two conveyor belts.

The second section may include at least one pushing system for allowing the trolleys to roll, in particular along the second main direction.

The pushing system may include a retractable pushing pallet device, able to bear upon one face of a trolley intended to be rolled. In particular, the pushing pallet device may include a pushing pallet, intended to bear upon the face of the trolley to be rolled, notably which may pivot between a first position in which the pushing pallet is in contact with the face of the trolley in order to allow the pushing of the trolley and a second position in which the pushing pallet has no action on the trolley allowing temporary or definitive storage of the trolley.

The pushing pallet device may be slideably mounted on a pushing arm. The pushing arm may for example include a worm screw.

The pushing system may further include an electric motor for controlling the sliding of the pushing pallet device along the pushing arm.

At least two pushing systems may be used in order to allow the pushing of a trolley along the two different directions of the second main direction.

The pushing system may be positioned so as to optimize the positioning of the centre of gravity of the assembly formed by the trolley and the pushing system. The pushing system may thus be substantially positioned at a third of the height of a trolley to be rolled. In this way, it may be possible to limit or even avoid any risk of toppling of the trolley.

The second section may advantageously be configured in order to allow automatic or semi-automatic displacement of the trolleys relatively to each other. In particular, the displacement of the trolleys from the second section to the first section may be programmed beforehand.

The first section may include an interface for controlling the operation of the second section.

The piece of furniture may include a visual and/or audible alert indicator for warning the user of the presence of a trolley to be extracted and/or of the presence of an empty location (or space) for depositing a trolley in the first section.

A further object of the invention, according to another of its aspects, is an aircraft including a piece of furniture as defined earlier.

The piece of furniture may be integrated at the rear of the fuselage of the aircraft, in a pressurized space located at least partly under the vertical stabilizer of the aircraft. More particularly, the piece of furniture may be incorporated into the rear portion of the aircraft located under the vertical stabilizer, usually non-pressurized and non-fitted out, by means of a displacement of the pressurized partition of the cabin towards the bottom of the aircraft.

A further object of the invention according to another of its aspects is a method for storing and/or using a trolley applied by means of a piece of furniture as defined earlier.

The object of the invention is notably a method for storing and/or using at least one trolley of a plurality of trolleys from a piece of furniture for aircraft including:
    a first section forming an interface of use for a user, and
    a second section allowing storage and/or transport of at least one trolley towards the user,
    the method including the following steps:
    taking up and/or depositing at least one trolley in the first section of the piece of furniture,
    having at least one portion of the trolleys circulate along at least first and second main directions substantially perpendicular to each other, at least in a plane of the aircraft,
    distributing at least one trolley from the second section towards the first section or vice versa.

During the circulation of trolleys, the displacement of a trolley may give the possibility of freeing a space which then becomes available in order to be occupied by another trolley.

The second section may form a carousel for circulation of trolleys while allowing displacement of trolleys around a central point of the second section, this displacement of trolleys at least partly defining the contour of a geometrical shape.

The method may further include the following step:
raising and/or lowering said at least one trolley respectively from the base of the first section towards the base of the second section or vice versa.

The method according to the invention may include any of the features stated earlier, taken individually or according to all technically possible combinations with other features.

BRIEF DESCRIPTION OF THE DRAWINGS

The invention may be better understood upon reading the detailed description which follows, of a non-limiting exemplary embodiment of the latter, as well as upon examining the schematic or partial figures of the appended drawing, wherein:

FIG. 4 is a partial sectional view of the aircraft of FIG. 1, FIGS. 5A and 5B schematically illustrate in a top view, a possible displacement of trolleys from the second section of the piece of furniture of FIG. 1, FIG. 6 schematically illustrates a possible path of a trolley from the first section towards the second section of the piece of furniture of FIG. 1, FIGS. 7A, 7B and 7C illustrate the application of a system for inserting and extracting trolleys from a piece of furniture according to the invention.

In the whole of these figures, identical references may designate identical or similar elements.

Further, the different portions illustrated in the figures are not necessarily illustrated according to a uniform scale in order to make the figures more legible.

DETAILED DESCRIPTION OF THE PREFERRED EMBODIMENTS

An exemplary embodiment of the invention is described hereafter with reference to an aircraft 10 including a piece of furniture 1 according to the invention, in particular a piece of galley furniture 1.

Figure 1:
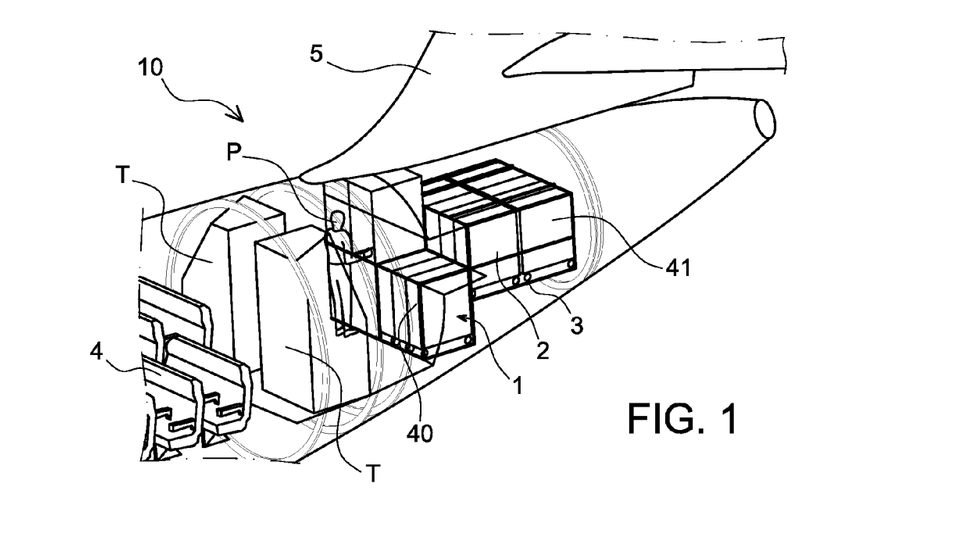
FIG. 1 partly or in a perspective view illustrates an exemplary aircraft including a piece of furniture according to the invention.

The rear portion of the fuselage of an aircraft 10 including a piece of galley furniture 1 according to the invention is illustrated partly in FIG. 1, in a perspective view.

The piece of galley furniture 1 is integrated into a space of the fuselage of the aircraft 10 usually unoccupied, which is located under the vertical stabilizer 5 of the aircraft 10, in particular in an area located at the rear of the seats 4 for passengers and of the toilet cabins T.

Figure 4:
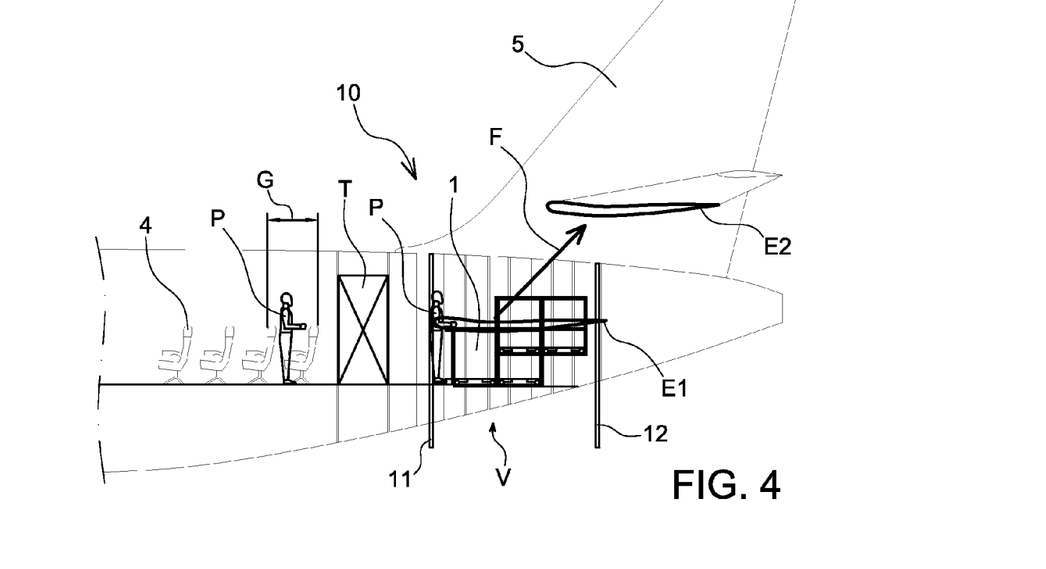

More specifically, as this may be seen in FIG. 4, the piece of galley furniture 1 is located in the rear of the usual pressurized partition 11 on an aircraft, which is displaced in order to form a new fireproof pressurized partition 12, located just in front of the auxiliary power generator (APU).

In this way, the displacement of the pressurized partition 11 towards the new pressurized partition 12 gives the possibility of gaining a pressurized space V into which the piece of galley furniture 1 is integrated. The tail of the aircraft 10 is then displaced from the usual position E1 to a new position E2 along the arrow F as illustrated in FIG. 4.

Advantageously, the layout of the piece of galley furniture 1 according to the invention in this new pressurized space V, at least partly located under the vertical stabilizer 5, may allow implementation of additional seats 4. A gain G of seats 4 may thus be obtained, as illustrated in FIG. 4. For example, the gain G may correspond to eight additional seats 4 for an aircraft 10 with a moderate size of usually about 200 passengers.

Figure 2:
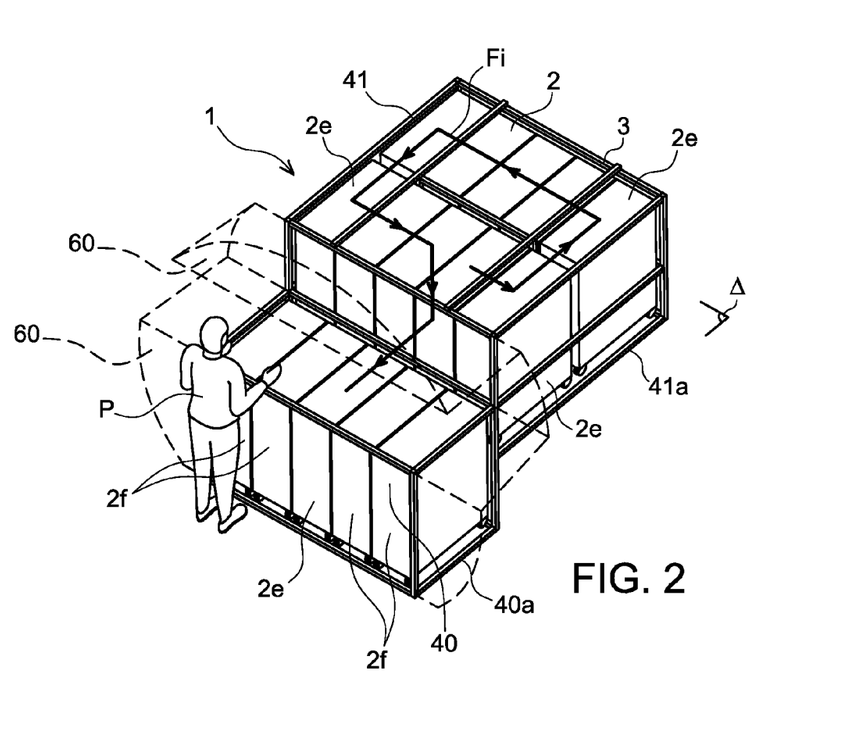
FIG. 2 illustrates in a perspective view, the piece of furniture of FIG. 1 in which trolleys are stored.
Figure 3:
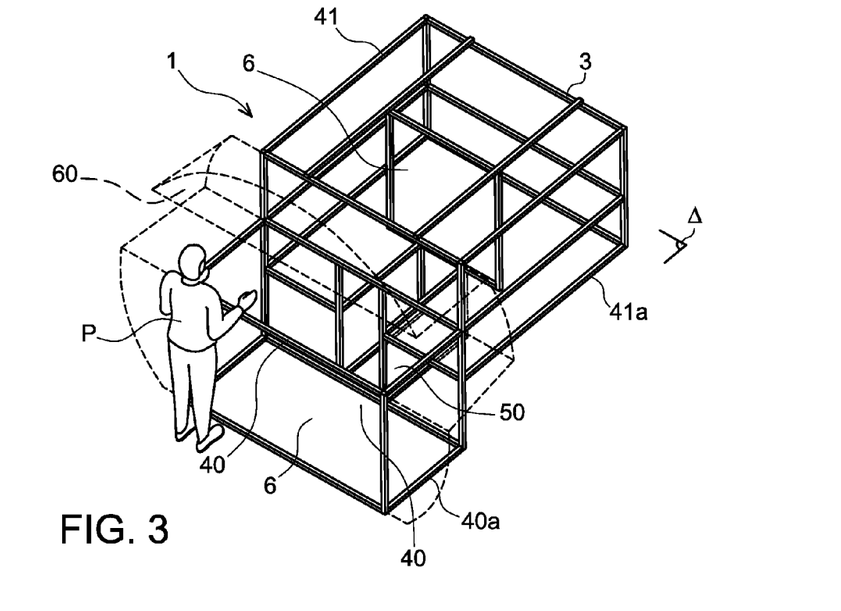
FIG. 3 illustrates in a perspective view, the piece of furniture of FIG. 1 without any trolley.

FIGS. 2 and 3 illustrate in a perspective view the piece of galley furniture 1 according to the invention respectively with and without the presence of trolleys 2. The trolleys 2 may allow storage of diverse elements for the aircraft 10. Preferably the trolleys are used for storing and/or preparing food.

In accordance with the invention, the piece of galley furniture 1 includes a first section 40 forming an interface of use for a user P allowing the taking and/or the depositing of at least one trolley 2 in the piece of galley furniture 1, and a second section 41 allowing circulation of the trolleys 2 along the first C1 and second C2 main directions substantially perpendicular to each other, at least in a plane Δ of the aircraft 10, in particular a horizontal plane Δ for storing and/or conveying at least one trolley 2 towards the user P.

Further, the first section 40 and/or the second section 41 include means for distributing at least one trolley 2 from the second section 41 to the first section 40 and vice versa.

The first section 40 forms an area for storing trolleys 2 and a buffered area for standard manual insertion and/or extraction of trolleys 2, accessible to user P, while the second section 41 forms an area for storing trolleys 2 and an area for automatic or semi-automatic distribution of trolleys 2, not accessible to user P.

The piece of galley furniture 1 may be formed by a chassis assembly 3 defining the first 40 and second 41 sections, as this may be seen in FIG. 3.

The first section 40 may include insulation panels 60 located at the interface between the first 40 and second 41 sections, notably preventing access for the user P to the second section 41.

Such insulation panels 60 may for example be formed from composite material, optionally coated with a decorative film.

The base 40a of the first section 40 and the base 41a of the second section 41 may be formed with panels 6 placed on the chassis assembly 3 of the piece of galley furniture 1.

The first section 40 and/or the second section 41 may if necessary be at least partly refrigerated, notably for allowing preservation of the stored food.

In order to be able to adapt to the strong changing section of the rear portion of the fuselage of the aircraft 10, the base 41a of the second section 41 may be raised relatively to the base 40a of the first section 40.

Further, the second section 41 may include distribution means in the form of a device 50 for raising a trolley 2 in order to allow distribution of a trolley 2 from the first section 40 towards the second section 41 and vice versa. Such a raising device 50 is subsequently further described with reference to FIGS. 8A and 8B.

The piece of galley furniture 1 may include trolleys 2e with automatic and/or semi-automatic displacement, in particular in the second section 41 and for the central trolley 2e of the first section 40, and fixed trolleys 2f which may only be displaced by manual action of the user P.

In order to allow circulation of the trolleys 2 of the piece of galley furniture 1, at least one space (or location) for storing a trolley 2 may be left vacant so as to allow movement of the trolleys 2 by buffering/shuffling. As an example, extraction of the central trolley 2e of the first section 40 in FIG. 2 may allow a space to be cleared in order to achieve movement along the arrow F1 of a trolley located in a second section 41 of the piece of galley furniture 1, according to a principle of buffering/shuffling play.

The second section 41 may form a carousel for circulating the trolleys 2 and allowing displacement of the trolleys 2 around a central point of the second section 41, this displacement of trolleys 2 defining at least partly the contour of a geometrical shape. In particular, in the illustrated example, the displacement of the trolleys 2 may form the contour of a square shape.

Figure 5A:
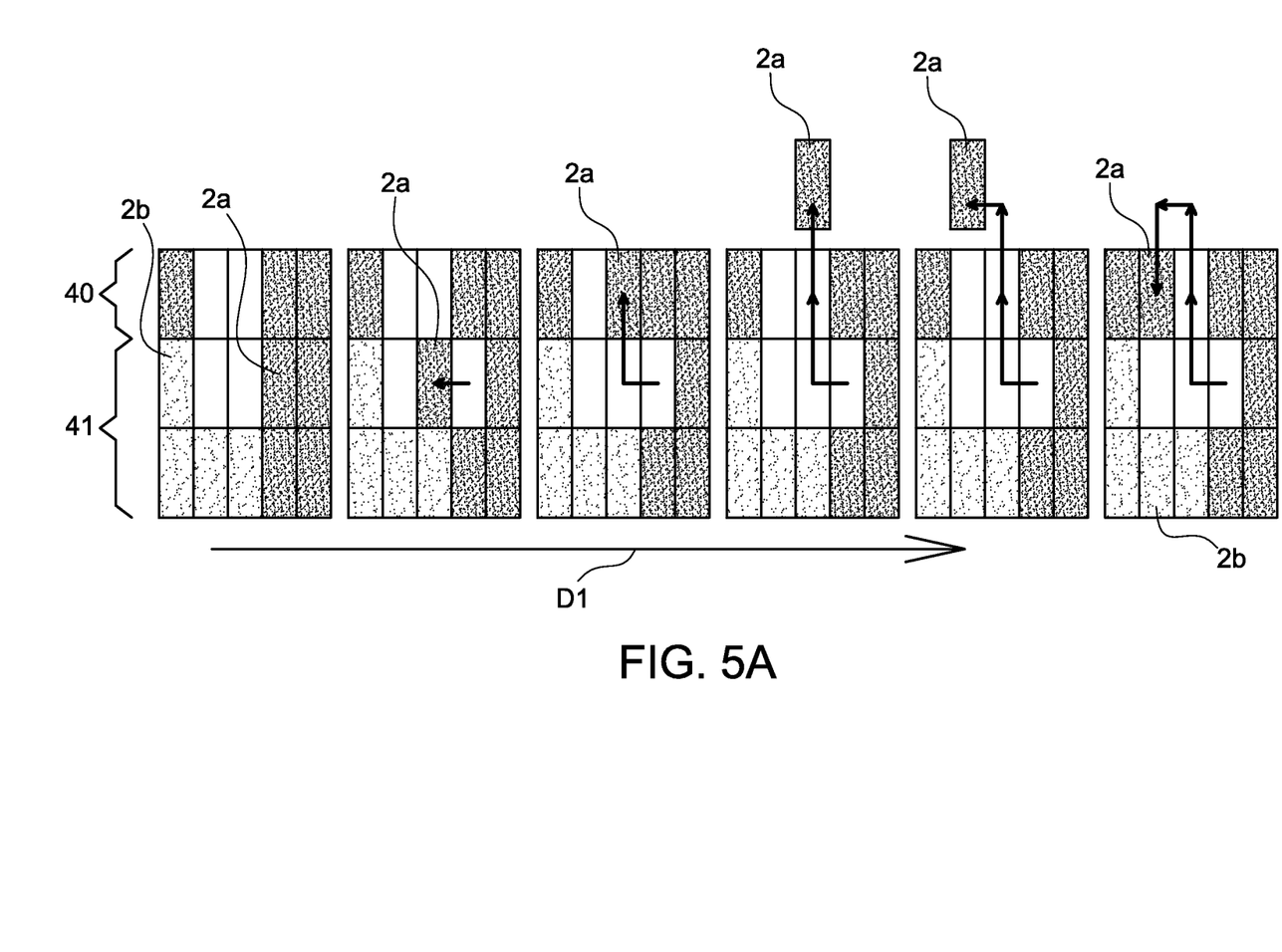
Figure 5B:
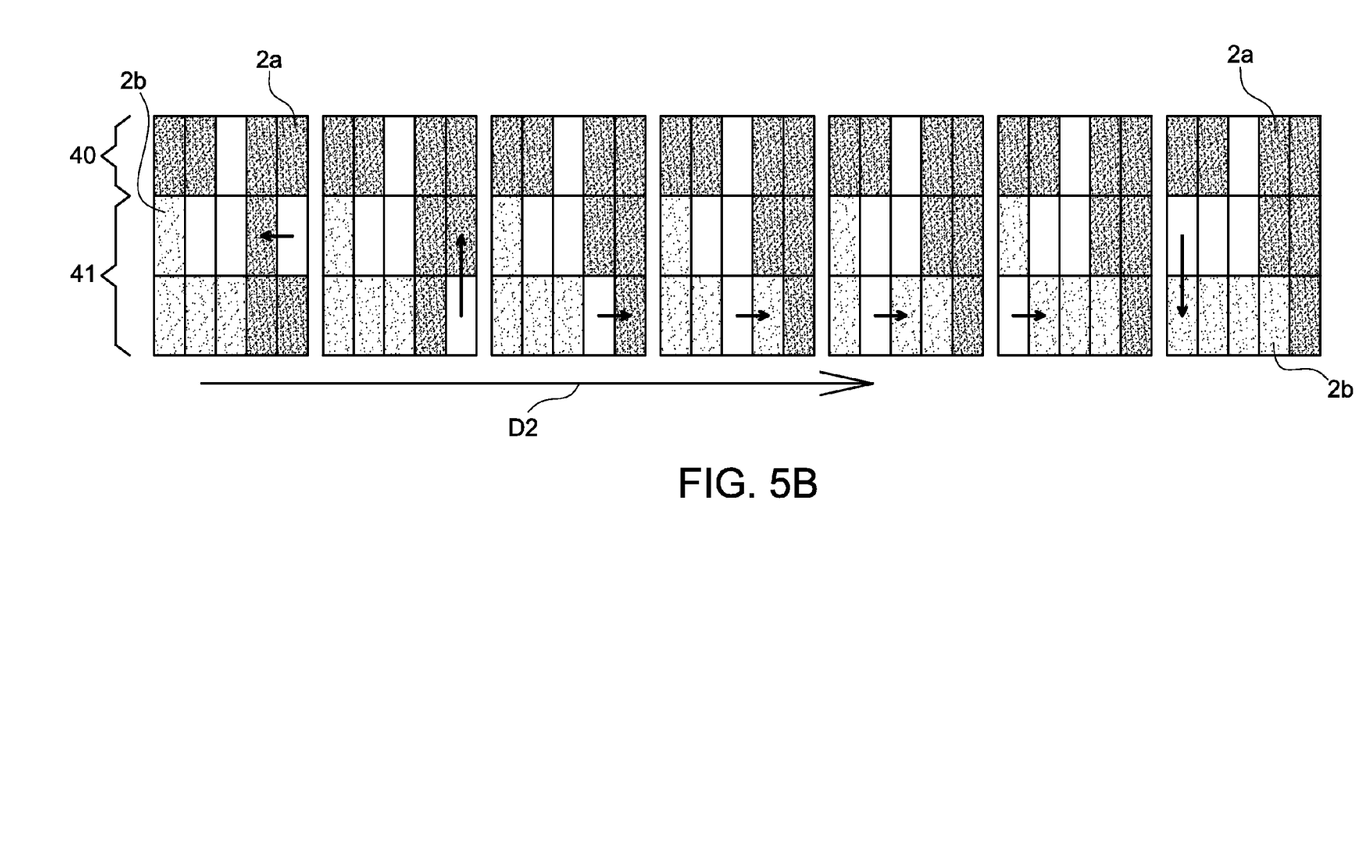

FIGS. 5A and 5B illustrate methods for displacing (or changing the order) of trolleys 2 at the second section 41 of the piece of galley furniture 1.

In particular, FIG. 5A illustrates sequencing for displacing a full trolley 2a, located in the second section 41, in order to extract it and bring it into a reserve buffer location of the first section 40. In FIG. 5A, the order of the steps is represented by the arrow D1.

FIG. 5B, as for it, illustrates reset sequencing with view to subsequent handling involving the displacement of full 2a and empty 2b trolleys according to the order of the steps materialized by the arrow D2.

Figure 6:
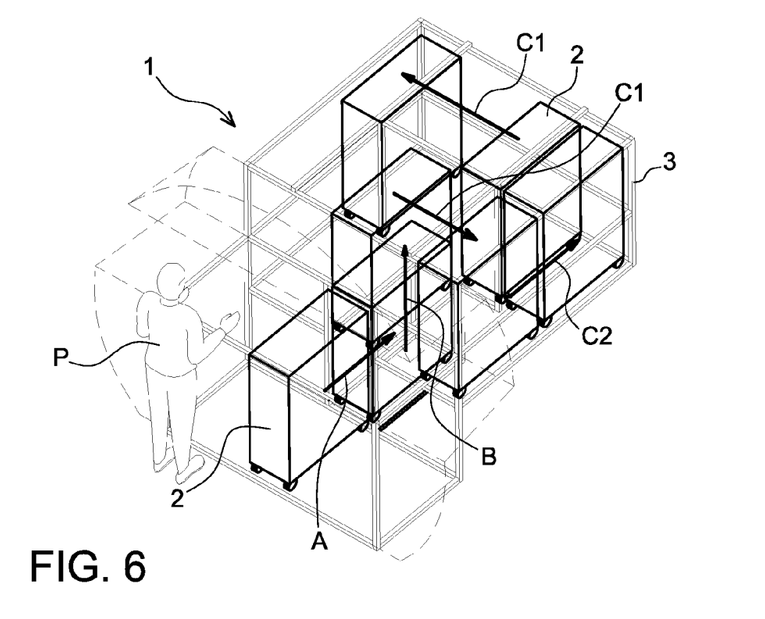

FIG. 6 schematically illustrates in a perspective view, the general principle for using the piece of galley furniture 1 by a user P for example in order to bring a trolley 2 into a storage configuration in the second section 41.

The user P may first insert the trolley 2 along a substantially horizontal direction A during an insertion phase from the first section 40 to the second section 41. Next, the trolley 2 is raised along a substantially vertical direction B towards the base 41a of the second section 41. At this stage, the circulation of the trolley 2 is accomplished along the first substantially horizontal direction C1 and the second substantially horizontal direction C2, perpendicular to each other. The displacement along the main direction C1 is accomplished according to a method for rolling the trolley 2 and the displacement along the second main direction C2 is accomplished according to a method for conveying the trolley 2.

The use of the piece of galley furniture 1 for the user P, for example on-board personnel, is therefore quite simple.

The on-board service may for example be first carried out with trolleys 2 located in the first section 40, manually instantaneously accessible like for a conventional piece of storage furniture.

The trolleys 2 stored in the second section 41 as for them may be preordered at best relatively to the needs during the flight of the aircraft 10.

The circulation of the trolleys 2 in the second section 41 may be determined in order to have the trolleys 2 circulate in a single direction so as to obtain the best efficiency ratio relatively to simplicity.

Depending gradually on the needs, it is possible to extract full trolleys 2 one by one from the second section 41 and to insert empty trolleys 2 into the second section 41 according to a buffering/shuffling principle. The full trolleys 2 extracted from the piece of galley furniture 1 may either be used directly, or placed in a storage location of the first section 40.

The availability and/or the absence of a trolley 2 at the first section 40 may be notified to a user P by means of a visual and/or audible indicator.

The first section 40 may if necessary include the control table for allowing entire or semi-automatic programming of the operation of the piece of galley furniture 1.

Figure 7A:
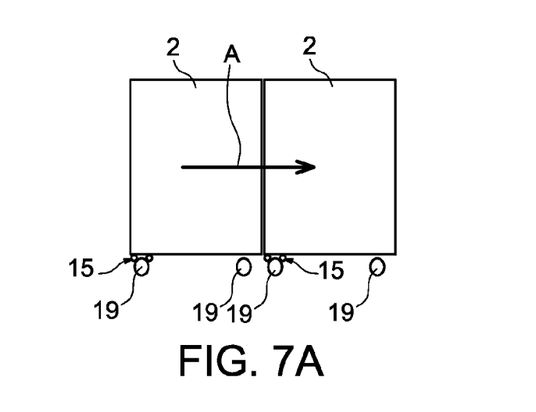
Figure 7B:
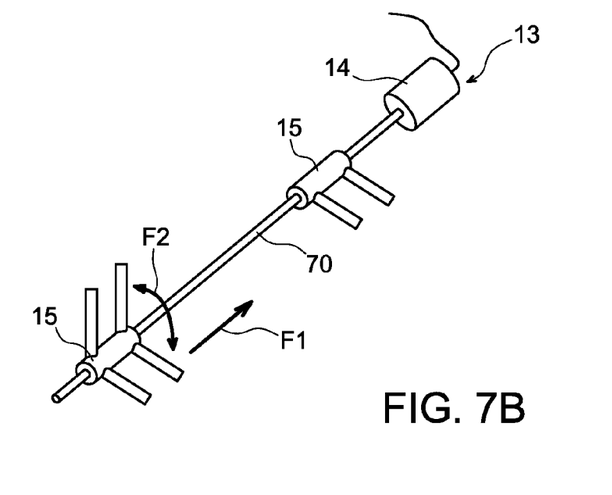
Figure 7C:
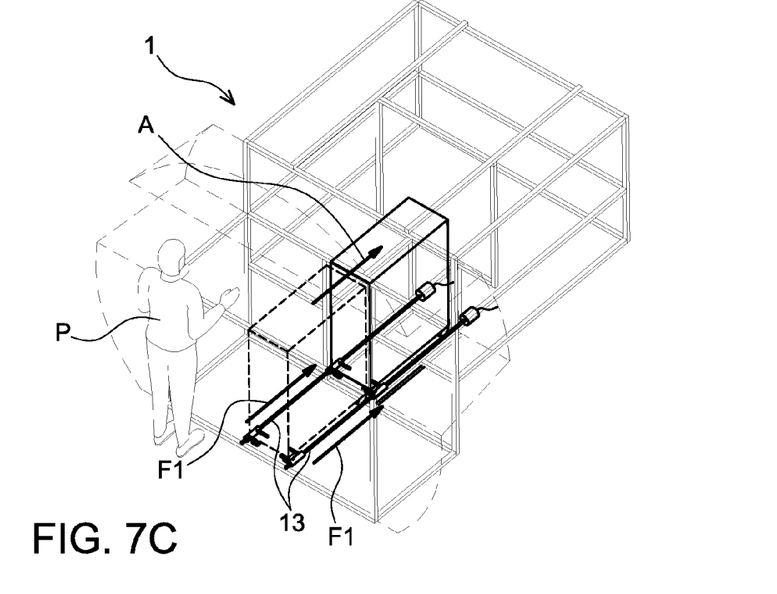

FIGS. 7A and 7B and 7C illustrate the principle of the mechanism allowing the insertion (or "swallowing up") and/or extraction of a trolley 2 from the first section 40 to the second section 41 and vice versa.

The insertion and/or the extraction is accomplished via at least one insertion and extraction system 13, notably two insertion and extraction systems 13 located on either side of the trolley 2 to be displaced, as this may be seen in FIG. 7C.

FIG. 7B illustrates an example of such an insertion and extraction system 13.

The latter includes a retractable yoke 15, slideably mounted on an insertion and extraction arm 70, for example a worm screw. The sliding is notably made possible via an electric motor 14 controlling the displacement of the yoke 15 along the arrow F1 for its sliding and along the arrow F2 for its pivoting between positions respectively allowing the blocking of a wheel 19 of the trolley 2 in order to allow its displacement and the releasing of the trolley 2 for its handling by the user P. The positioning of the yoke 15 relatively to the wheel 19 may be determined so as to allow sufficient displacement of the yoke 15 around the wheel 19 in order to allow its pivoting between the positions allowing blocking of the wheel 19 and freeing of the wheel 19.

The symmetrization of the insertion and/or extraction principle by the positioning of two insertion and extraction systems 13 on either side of the trolley 2 gives the possibility of obtaining the axial thrust along the direction A.

Figure 8A:
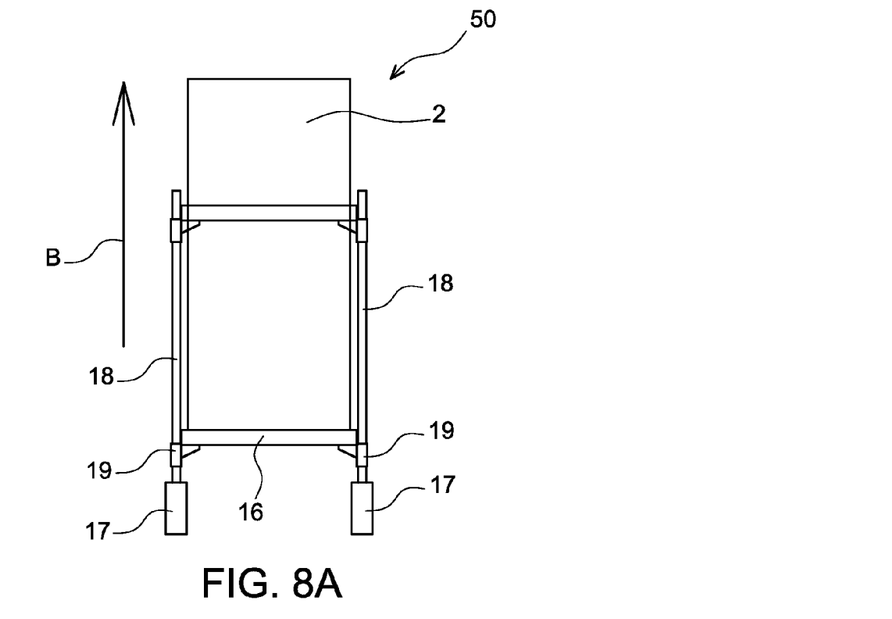
FIGS. 8A and 8B illustrate the application of a device for raising a piece of furniture according to the invention, FIG. 9 schematically illustrates a configuration of the base of the second section of a piece of furniture according to the invention for allowing rolling and conveying of trolleys.
Figure 8B:
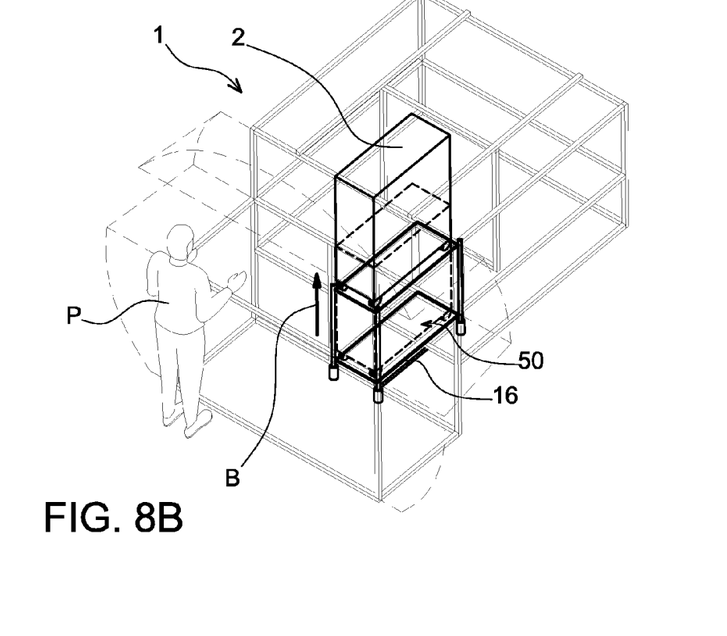

FIGS. 8A and 8B schematically illustrate the operating principle of the raising device 50 allowing a trolley 2 to be brought from the base 40a of the first section 40 to the base 41a of the second section 41, or vice versa, along the substantially vertical direction B.

The raising device 50 includes an elevator plate 16, which for example rests on four plate supports 19 slideably mounted on four sliding arms 18, for example worm screws. The raising and/or lowering of the elevator plate 16 resting on the plate supports 19 may be made possible via four electric motors 17, notably synchronized electric step motors in order to ensure controlled horizontality of the elevator plate 16.

Figure 9:
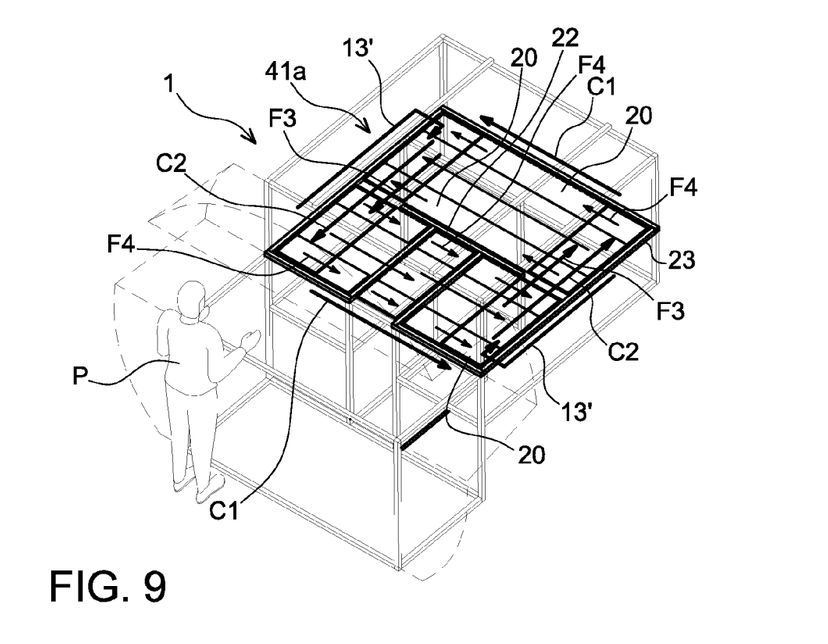

FIG. 9 illustrates in a perspective view an exemplary configuration of the base 41a of the second section 41 in order to allow displacement of the trolleys 2 along the first C1 and second C2 main directions perpendicular to each other, respectively associated with the displacement methods by transport and by rolling.

More particularly, the base 41a may include a peripheral frame 23 inside which appear pushing systems 13', more specifically described subsequently with reference to FIGS. 11A to 11D, so as to allow a displacement along the arrows F3 of the trolleys 2 according to a rolling method. Conveyor belts 20 allow the displacement of the trolleys 2 along the arrows F4 according to a conveyance method. A separating barrier 22 may be provided for delimiting the area of the base 41a of the second section 41 allowing displacement along a first sense of the first main direction C1 and the area of the base 41a of the second section 41 allowing a displacement in the opposite sense along the first main direction C1.

FIGS. 10A to 10D more specifically illustrate the displacement of the trolleys 2 depending on the conveyance method, using conveyor belts 20.

In this method, the conveyor belts 20 are provided for allowing passive displacement of the trolleys 2 along the first main direction C1, the wheels 19 of the trolleys 2 being placed perpendicularly to the displacement along the arrows F4 of the conveyor belt 20.

Figure 10A:
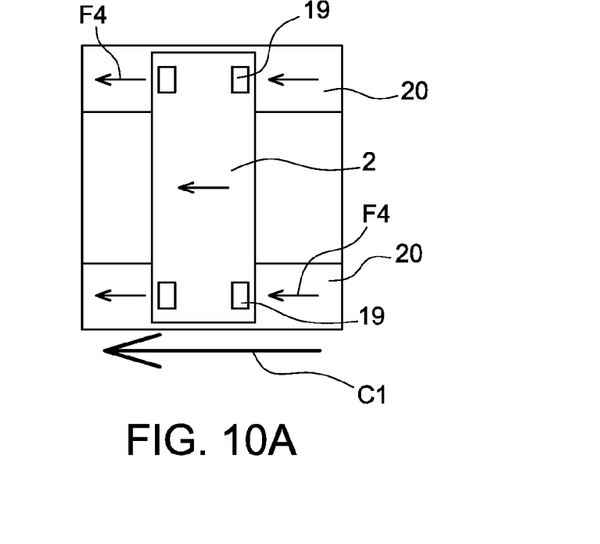
FIGS. 10A, 10B, 10C and 10D illustrate the application of the transport method with a conveyor belt of a piece of furniture according to the invention.

The conveyor belt 20 may be integrated and motor-driven independently in the second section 41.

Figure 10B:
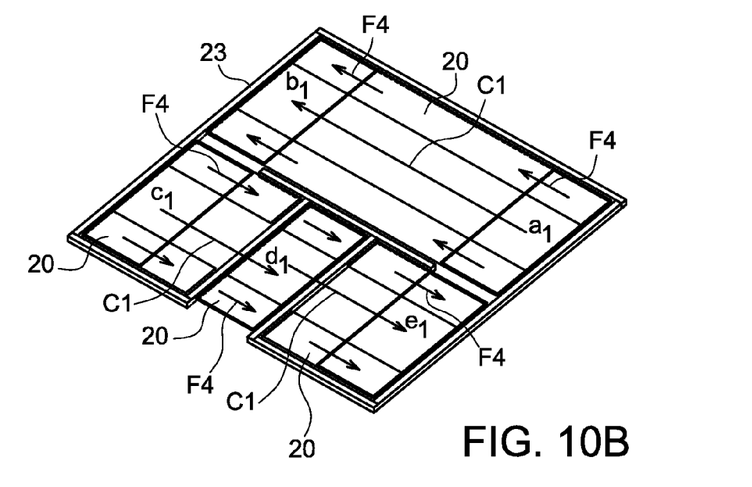

FIG. 10B schematically illustrates possible displacements of a trolley 2 from an area a1 to an area b1, and from an area c1 towards an area e1 with intermediate passing through an area d1.

Figure 10C:
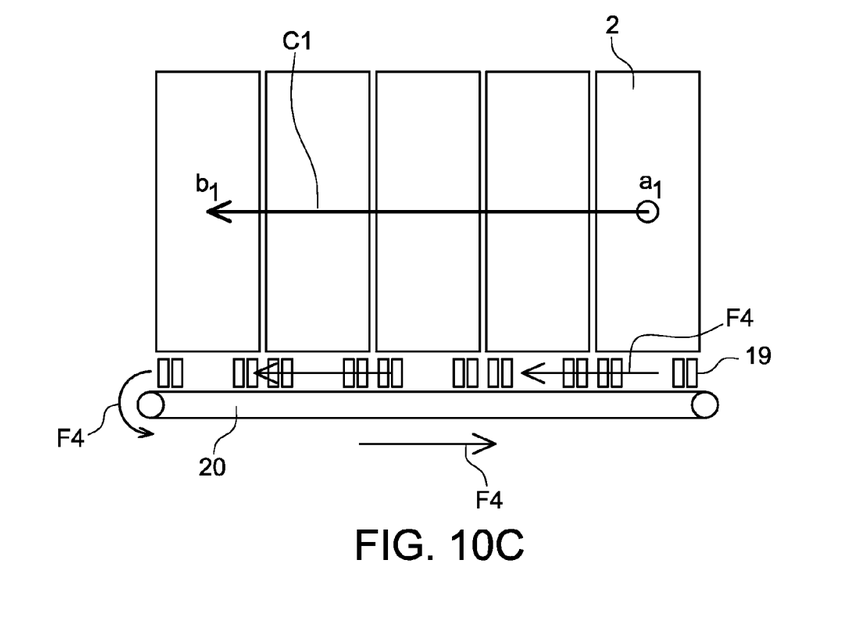

FIG. 10C more particularly illustrates in a sectional view the use of a single conveyor belt 20 for allowing the passing from the area a1 to the area b1.

Figure 10D:
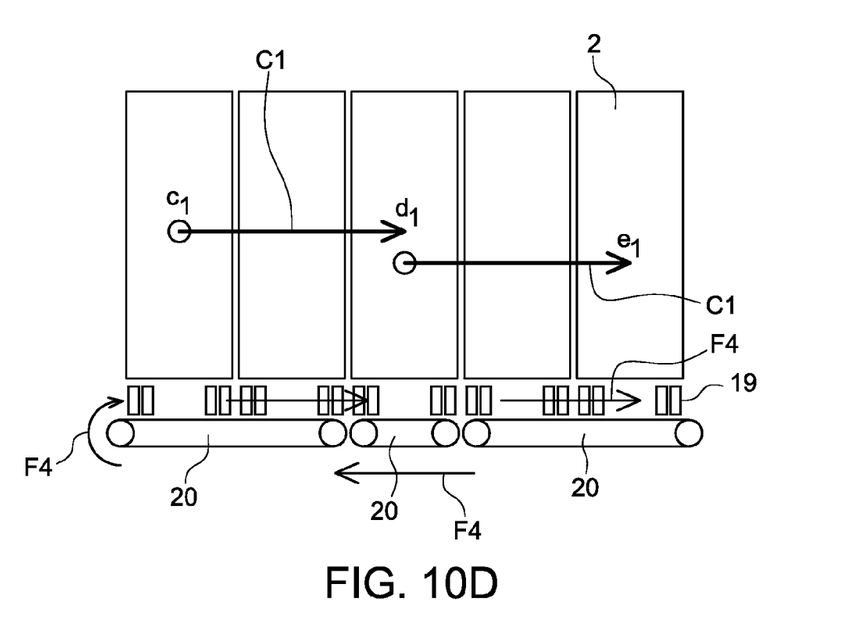

FIG. 10D, as for it, illustrates in a sectional view, the details for allowing the passing from the area c1 to the area d1 and then to the area e1 with the use of three conveyor belts 20. In particular, the intermediate conveyor belt 20 which corresponds to the area d1, may be located on the elevator plate 16 of the raising device 50. The passing of the trolley 2 from a conveyor belt 20 to another adjacent one may be facilitated by suitable selection of the geometry of the conveyor belt 20, notably in order to obtain a substantially planar junction area between the adjacent conveyor belts 20. It may also be facilitated by the presence of several juxtaposed wheels on the trolley 2, in particular two wheels, so that upon passing from one conveyor belt 20 to another adjacent one, at least one wheel of the trolley 2 is located on each conveyor belt 20.

FIGS. 11A to 11D are more specifically relative to the displacement of the trolleys 2 according to the rolling method, along the second main direction C2.

Figure 11A:
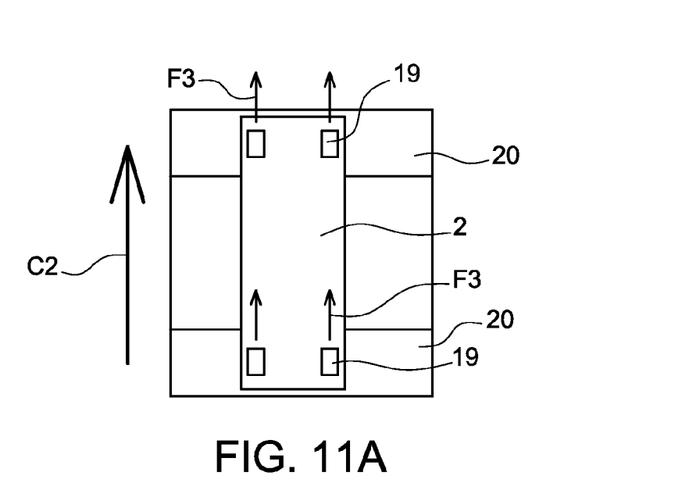
FIGS. 11A, 11B, 11C and 11D illustrate the application of the rolling method by a pushing system by a piece of furniture according to the invention.

As illustrated in FIG. 11A, the trolley 2 includes wheels 19 oriented parallel to the second main direction C2 in order to allow rolling of the trolley 2. In this rolling method, the conveyor belts 20 are at a standstill and the trolleys 2 are capable of rolling over the latter while also crossing fixed floors located between the conveyor belts 20.

Figure 11B:
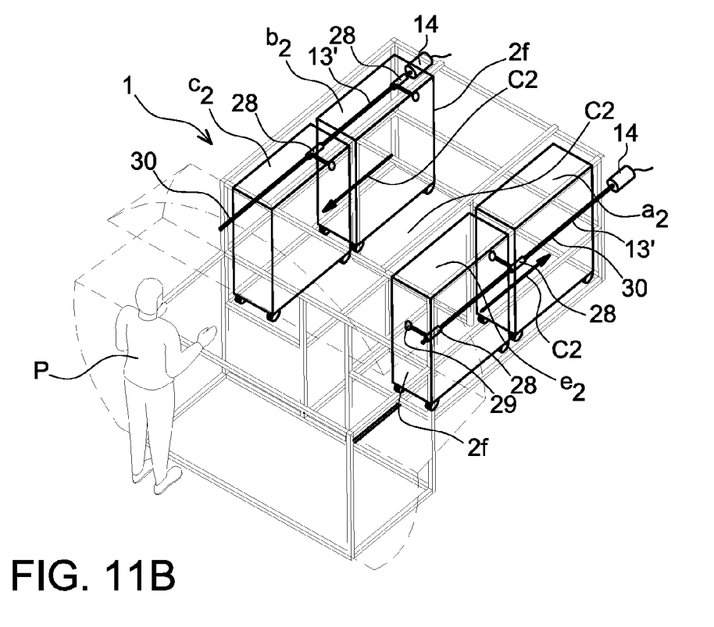

The displacement of the trolleys 2 in a rolling method is ensured via at least one pushing system 13', notably two pushing systems 13', i.e. one for each displacement direction along the second main direction C2, as illustrated in FIG. 11B.

The pushing system 13' includes a retractable pushing pallet device 28, able to bear upon a face 2f of a trolley 2 to be rolled, the pushing pallet device 28 being slideably mounted on a pushing arm 30, for example a worm screw.

Figure 11C:
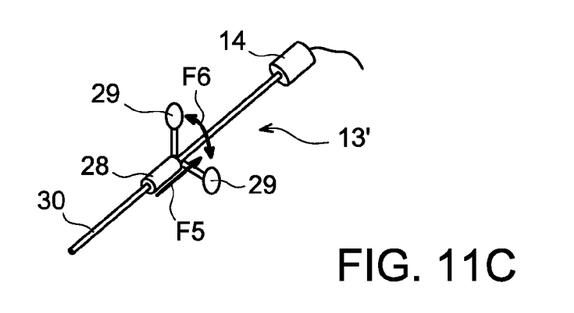

An electric motor 14 may be provided for allowing the sliding of the pushing pallet device 28 along the pushing arm 30 according to the arrow F5, as illustrated in FIG. 11C. Further, the electric motor 14 may allow pivoting of a pushing pallet 29 of the pushing pallet device 28 according to the arrow F6 between a position in which the pushing pallet 29 is placed against the face 2f of the trolley 2 in order to allow its displacement and a position in which the pushing pallet 29 has no action on the trolley 2 so as to allow storage of the trolley 2.

As this may be seen in FIG. 11B, the piece of galley furniture 1 may include a first pushing system 13' allowing the displacement of a trolley 2 from a position b2 to a position c2, and a second pushing system 13' allowing displacement of a trolley 2 from a first position e2 to a second one a2.

Figure 11D:
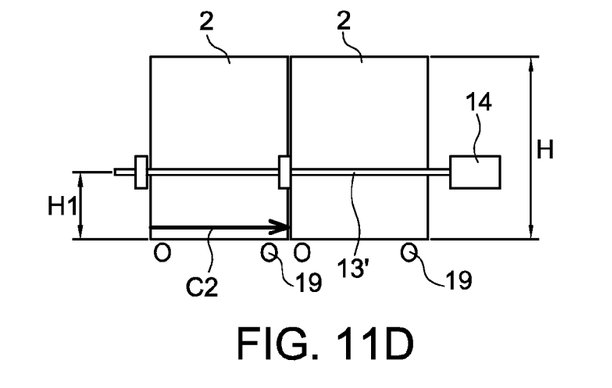

Moreover, the pushing system 13' may be substantially positioned at one third H1 of the height H of the trolley 2 to be rolled, as this may be seen in FIG. 11D, so as to avoid, or at least limit any risk of toppling of the trolley 2. The positioning at the third H1 of the height H of the trolley 2 notably corresponds to optimized positioning with regard to the center of gravity of the assembly formed by the trolley 2 and the pushing system 13'.

Of course, the invention is not limited to the exemplary embodiment which has just been described. Diverse modifications may be provided thereto by one skilled in the art.

In particular, the pushing system 13 may be different from the one shown. It may for example include a telescopic actuator in order to allow displacement of a trolley 2.

The second section 41 may be modified, notably by symmetrization of the pushing system 13 and reversible operation of the conveyor belt 20 in order to allow circulation of the trolleys 2 in both senses along the first C1 and second C2 main directions. In this way, the circulation of the trolleys 2 may be more rapid.

The base 41a of the second section 41 is, in the example shown, shifted relatively to the base 40a of the first section 40, and therefore shifted relatively to the floor of the cabin, insofar that the piece of galley furniture 1 is installed in the rear portion of the fuselage of the aircraft 10 with strong conicity. Alternatively, if it is possible to have an unoccupied area of sufficient dimensions available in the cabin, the base 41a of the second section 41 may not be raised relatively to the base 40a of the first section 40. In particular, the base 41a of the second section 41 may be provided so as to be substantially in the same plane as the floor of the cabin.

The expression "including one" should be understood as being a synonym of "including at least one", unless specified otherwise.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A piece of furniture for an aircraft including:
   a plurality of trolleys,
   a first section forming the interface of use for a user allowing at least one of the taking and the deposition of at least one trolley in the piece of furniture,
   a second section allowing the trolleys to circulate along at least first and second main directions perpendicular to each other, at least in a horizontal plane of the aircraft, for at least one of storing and bringing at least one trolley to the user, the first and second sections not being directly or indirectly superposed on each other, and the first and second sections being offset in the horizontal direction,
   at least one of the first section and second section including means for distributing at least one trolley from the second section to the first section and vice versa.

2. The piece of furniture according to claim 1, wherein during circulation of the trolleys, the second section is configured so as to allow a space to be freed during the displacement of a trolley, this space then being available to be occupied by another trolley.

3. The piece of furniture according to claim 1, wherein the second section forms a carousel for circulation of the trolleys by allowing the displacement of the trolleys around a central point of the second section, this displacement of trolleys at least partly defining the contour of a geometrical shape.

4. The piece of furniture according to claim 1, wherein the base of the second section is raised relative to the base of the first section, and wherein the second section includes distribution means in the form of a device for raising a trolley in order to allow distribution of at least one trolley from the first section to the second section and vice versa.

5. The piece of furniture according to claim 4, wherein the raising device includes an elevator plate sized to receive a trolley to be distributed from the first section to the second section or vice versa, configured so as to move along a given direction between a first position in the plane of the base of the first section and a second position in the plane of the base of the second section.

6. The piece of furniture according to claim 1, wherein at least one of the first section and the second section includes distribution means in the form of at least one system for inserting and extracting at least one trolley to allow distribution of said at least one trolley from the second section to the first section or vice versa, the insertion and extraction system including a retractable yoke able to bear upon at least one wheel of said at least one trolley to be distributed, the yoke being slideably mounted on an insertion and extraction arm.

7. The piece of furniture according to claim 1, wherein the second section includes at least one conveyor belt for conveyance of the trolleys.

8. The piece of furniture according to claim 1, wherein the second section includes at least one pushing system for rolling of the trolleys.

9. The piece of furniture according to claim 8, wherein the pushing system includes a retractable pushing pallet able to bear upon one face of a trolley to be rolled, the pushing pallet being slideably mounted on a pushing arm.

10. The piece of furniture according to claim 8, wherein the pushing system is positioned at one third of the height of a trolley to be rolled.

11. The piece of furniture according to claim 1, wherein the piece of furniture is a piece of galley furniture.

12. The piece of furniture according to claim 1, wherein the first section is configured in order to allow storage of at least one portion of the plurality of trolleys.

13. An aircraft including a piece of furniture comprising:
   a plurality of trolleys,
   a first section forming the interface of use for a user allowing at least one of the taking and the deposition of at least one trolley in the piece of furniture,
   a second section allowing the trolleys to circulate along at least first and second main directions perpendicular to each other, at least in a horizontal plane of the aircraft, for at least one of storing and bringing at least one trolley to the user, the first and second sections not being directly or indirectly superposed on each other, the first and second sections being offset in the horizontal direction,
   at least one of the first section and second section including means for distributing at least one trolley from the second section to the first section and vice versa.

14. The aircraft according to claim 13, wherein the piece of furniture is integrated at the rear of the fuselage of the aircraft, in a pressurized space, at least partly located under the vertical stabilizer of the aircraft.

15. A method for at least one of storing and using at least one trolley from a plurality of trolleys of a piece of furniture for an aircraft including:
   a first section forming an interface of user for a user, and
   a second section allowing at least one of storage and conveyance of at least one trolley towards the user, the first and second sections not being directly or indirectly superposed relatively to each other, the first and second sections being offset in the horizontal direction,
the method including the following steps:
   at least one of taking and depositing at least one trolley in the first section of the piece of furniture,
   circulating at least one portion of the trolleys along at least first and second main directions perpendicular to each other, at least in a horizontal plane of the aircraft,
   distributing at least one trolley from the second section to the first section and vice versa.

16. The method according to claim 15, wherein during the circulation of the trolleys, the displacement of a trolley allows the freeing of a space which then becomes available to be occupied by another trolley.

17. The method according to claim 15, wherein the second section forms a carousel for circulation of trolleys by allowing the displacement of trolleys around a central point of the second section, this displacement of trolleys at least partly defining the contour of a geometrical shape.

18. The method according to claim 15, wherein it includes the following step:
   at least one of raising and lowering said at least one trolley respectively from the base of the first section to the base of the second section or vice versa.

* * * * *